(No Model.) 2 Sheets—Sheet 1.

A. R. BYRKETT.
WHEEL OR PULLEY.

No. 289,335. Patented Nov. 27, 1883.

WITNESSES:
Fred. G. Dieterich
E. P. Hough

INVENTOR,
Ahijah R. Byrkett
By Chas. J. Gooch
ATTORNEY (No Model.) 2 Sheets—Sheet 2.

A. R. BYRKETT.
WHEEL OR PULLEY.

No. 289,335. Patented Nov. 27, 1883.

WITNESSES:
Fred. G. Dieterich
E. L. Hough.

INVENTOR.
Abijah R. Byrkett
By Chas. J. Gooch
ATTORNEY

N. PETERS, Photo-Lithographer, Washington, D. C.

UNITED STATES PATENT OFFICE.

AHIJAH R. BYRKETT, OF TROY, OHIO.

WHEEL OR PULLEY.

SPECIFICATION forming part of Letters Patent No. 289,335, dated November 27, 1883.

Application filed July 3, 1883. (No model.)

*To all whom it may concern:*

Be it known that I, AHIJAH R. BYRKETT, a citizen of the United States, residing at Troy, in the county of Miami and State of Ohio, have invented certain new and useful Improvements in Wheels and Pulleys, of which the following is a specification, reference being had therein to the accompanying drawings.
This invention relates to that class of wheels constructed of two disks of metal joined together by means of a tire surrounding the edges of said disks.

The object of this invention is to produce pulleys and wheels for general use in connection with such articles as wheelbarrows, planters, sulky-plows, reapers and mowers, railroad-cars, vehicles, and the like, which possess the advantages of cheapness in construction, lightness, strength, and durability. To this end, to form each wheel or pulley, I take two circular pieces of metal of the desired size and thickness and cut or slit the center of each disk or circular piece into cross or other suitable form or shape. I then bend such slit portion outward to form an outwardly-extending flange of round, square, or other desired shape, which flange is secured to the axle by rivets, nails, or other suitable means. Around the peripheral edge of each circular piece or disk is formed a flange extending at right angles to said disk, and to these peripheral flanges the tire is secured by bolts, rivets, or other well-known appliances, all as hereinafter fully described and claimed.

Figure 1:
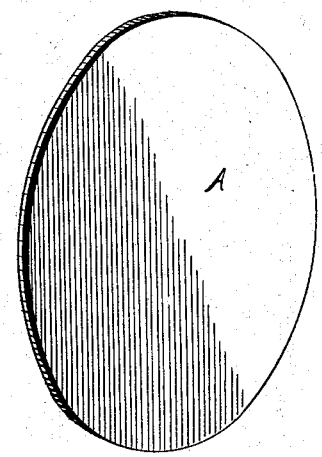
Figure 2:
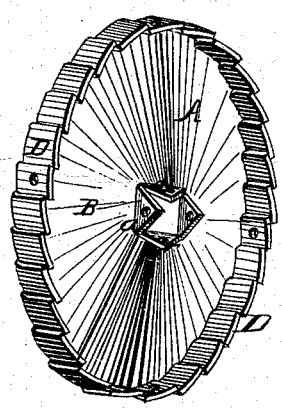
Figure 3:
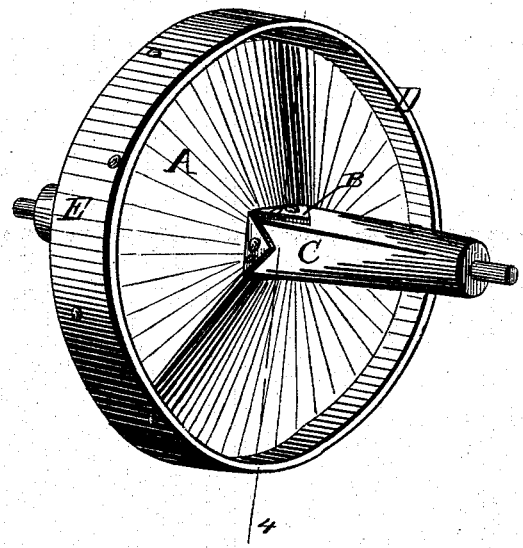
Figure 4:
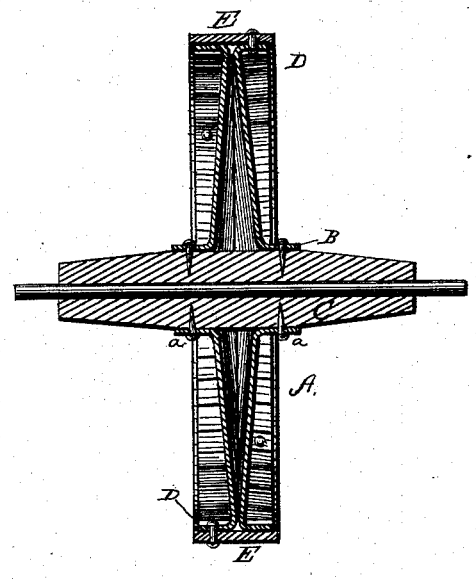
Figure 5:
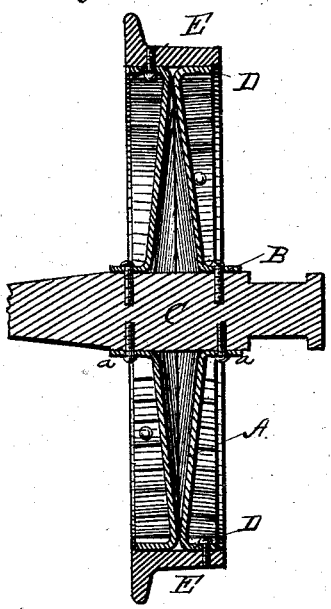

In the drawings, Figure 1 represents a perspective view of a circular concavo-convex sheet of metal or blank forming one face of a wheel or pulley constructed according to my invention. Fig. 2 represents a perspective view of said sheet or disk having the circumferential and central flanges formed therefrom. Fig. 3 represents a perspective view of a wheel adapted for use on wheelbarrows, wheeled agricultural and other machines, and vehicles, and constructed according to my invention. Fig. 4 is a vertical section on the line 4 4 of Fig. 1. Fig. 5 represents a railroad-car wheel, and Fig. 6 a grooved and Fig. 7 a band pulley constructed according to my invention.

A represents a disk or circular piece of metal, which may be of any suitable size and thickness, according to the use to which it is to be put.

B represents a flange or lip, to which the axle C is attached. This flange B is formed by slitting the center of the disk into cross or other shape and then bowing or bending such slit portions outward at right angles to the plane of the disk, as shown. The slit is shown in the drawings as of cross shape, and the lips *a a*, when bent or bowed outward at right angles to said disk, as of angular form; but the flange B may be formed by slitting or cutting the disk in any other desired shape, so as to form the flange of circular or other suitable contour, depending upon the shape of the axle to which said flange or flanges B are to be attached. The disk A is formed dish-shaped, preferably when hot, by swaging between dies, one of which is of concave and the other of convex form; and either at the same or at a subsequent operation the outer edge of said disk A is swaged, cut, or otherwise formed over into a flange, D, extending at right angles to the plane of the disk, and in the same direction and upon the same side thereof as the center flange, B.

Figure 6:
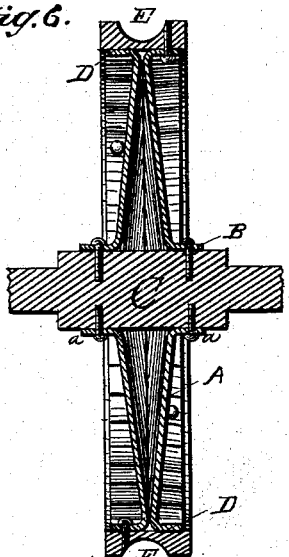
Figure 7:
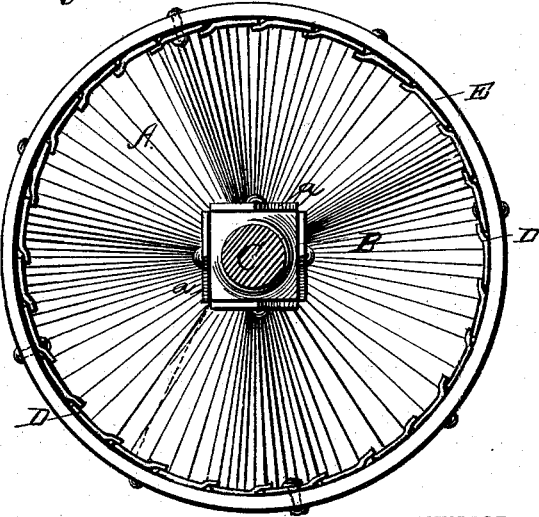

E represents a rim or tire, which may either be of flat shape, as shown in Figs. 3, 4, and 7, adapted for road travel or for band-pulleys, or with a flange as in the car-wheel shown in Fig. 5, or with a circumferential groove, as shown in the pulley represented in Fig. 6, or of any other desired form, according to the use to which the wheel is to be put.

In constructing a wheel or pulley two of the disks A are placed in juxtaposition, with their concaved surfaces facing inward and opposite each other, and with the convex faces and the interior and central flanges projecting outward, and the rim or tire E secured upon and around the flanges D D either by shrinking the same in position or by means of bolts, rivets, or other suitable devices passed through said rim or tire and each flange D. The wheel or pulley is then ready for the market, and can be readily placed in position upon the axle of a vehicle, wheelbarrow, or other carriage, or upon a spindle, sleeve, or arm, by either slipping said wheel or pulley thereon or by passing such axle, &c., through the central opening in said wheel or pulley, and then attaching the central flanges, B, and the axle or other support together by rivets, nails, or other well-known means. By this construction wheels or pulleys of any desired width of tread can be readily formed, as the disks A can be secured at any desired distance apart, depending upon the breadth of the rim or tire. For instance, where a narrow wheel is desired, the disks may be placed together with their faces abutting against each other and a narrow rim or tire placed around the flanged edges, and where a broad wheel or pulley is desired said disks can be secured at any desired distance apart by attaching the flanges D near to the outer edges of the rim or tire, however broad it may be. Where a grooved pulley is to be formed, the disks would necessarily be secured to the rim or tire at a distance apart to allow of a space being left between them, within which the swell of the groove may rest. By this construction the width or breadth of wheels or pulleys can be readily changed and converted to different breadths or widths by simply removing the rim or tire and substituting therefor a rim or tire of the desired breadth.

By this improvement I am enabled to readily construct wheels and pulleys of any desired size and breadth of tread very cheaply, and possessing the additional qualities of lightness, as any kind and quality of metal may be employed in forming the disks, depending upon the nature of the work to be accomplished thereby. For instance, tin, sheet-brass, copper, iron, or other metal or alloy of any requisite degree of thinness may be employed, of strength and durability, as the disks may be as thick as desired, and are strengthened and braced by the center flanges and circumferential flanges and tire or rim. Wheels and pulleys of this character are capable of very general use. Pulleys so constructed can be used in all places where pulleys are now employed, and the wheels can be advantageously employed on railroad-cars, wheelbarrows, reapers, mowers, sulky-plows, and all wheeled agricultural machines, and in vehicles generally.

In some cases, notably those where there is but slight friction upon the wheel, and where the strain thereon is very light and it is subjected to very light usage, I may dispense with the tire and simply use two of the flanged disks, A, in which case the disks will be riveted, bolted, or otherwise secured together just below their circumference or flanges, and the tread of the wheel will then be directly upon the circumferential flanges D themselves.

Having thus described my invention, what I claim therein is—

1. A wheel or pulley composed of two concavo-convex disks having circumferential flanges and a suitable rim or tire, substantially as set forth.

2. A wheel or pulley composed of two concavo-convex disks having central flanges to adapt the same for attachment to an axle or spindle and circumferential flanges, and a suitable rim or tire, substantially as and for the purpose set forth.

3. A wheel or pulley composed of two concavo-convex disks having circumferential flanges and central downwardly-extending flanges, substantially as and for the purpose set forth.

In testimony whereof I affix my siganture in presence of two witnesses.

AHIJAH R. BYRKETT.

Witnesses:
A. E. CHILDS,
A. F. BROOMHALL.